Feb. 9, 1926.

W. E. DUNSTON

BUMPER SUPPORTING MEANS

Filed May 8, 1923

1,572,596

Inventor
Wayne E. Dunston
By Hull, Brock & West,
Attys.

Patented Feb. 9, 1926.

1,572,596

UNITED STATES PATENT OFFICE.

WAYNE E. DUNSTON, OF DETROIT, MICHIGAN, ASSIGNOR TO THE C. G. SPRING & BUMPER COMPANY, OF DETROIT, MICHIGAN, A CORPORATION OF DELAWARE.

BUMPER-SUPPORTING MEANS.

Application filed May 8, 1923. Serial No. 637,464.

*To all whom it may concern:*

Be it known that I, WAYNE E. DUNSTON, a citizen of the United States, residing at Detroit, in the county of Wayne and State of Michigan, have invented a certain new and useful Improvement in Bumper-Supporting Means, of which the following is a full, clear, and exact description, reference being had to the accompanying drawings.

Figure 1:
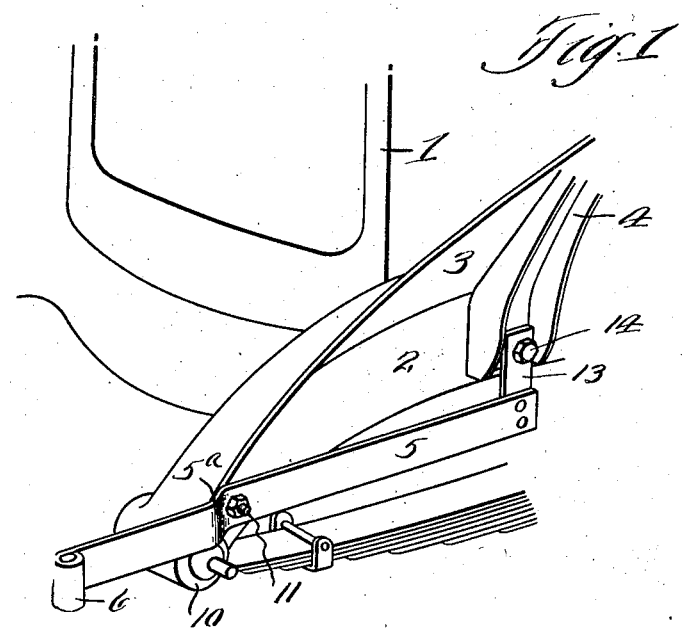
Figure 2:
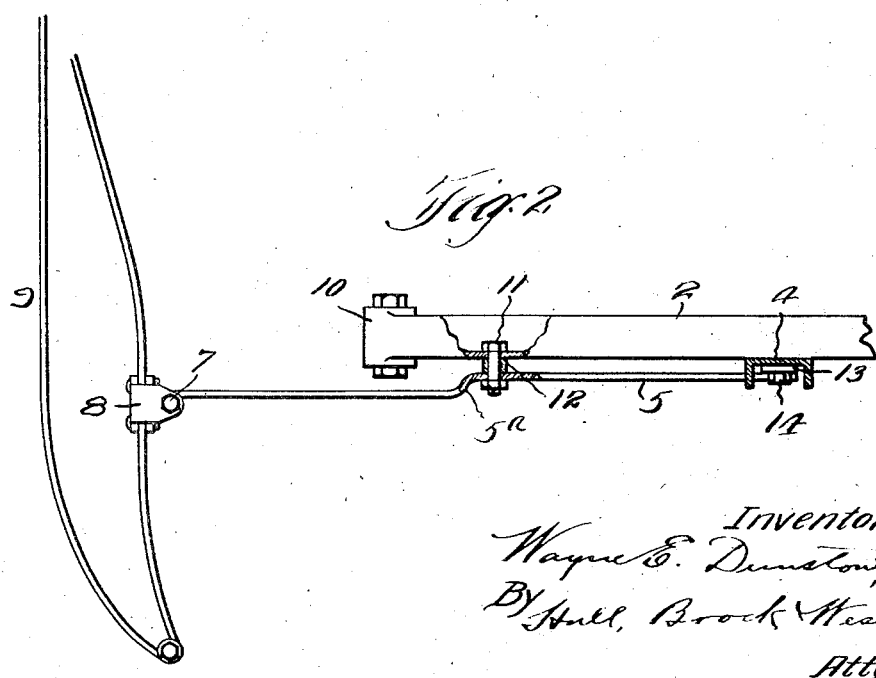

This invention relates to means for supporting bumpers from the side members of automobiles, and has for its general object to provide a supporting device which is especially adapted for a certain type and construction of automobile and which will enable the supporting arms to be conveniently and quickly applied to such vehicles and to form, when so applied, an efficient means for supporting and sustaining the attached bumpers. The bumper supporting arm and attaching means shown herein are particularly well adapted for use with a side frame member wherein the fender is so connected to the side frame as to prevent direct connection between the supporting arms and such frame. In the drawings, Fig. 1 represents a detail in perspective of the front of an automobile showing one of the supporting arms connected thereto; and Fig. 2 a sectional plan view of one of the side members, the cooperating supporting arm, and the bumper.

Describing the various parts by reference characters, 1 indicates the radiator and 2 the front portion of one of the side members of an automobile wherein the fender 3 is so connected to the said member as to prevent direct connection of a bumper supporting arm therewith. In the type of vehicle indicated herein, 4 denotes one of the front fender brackets, which is secured to the side frame by means of one or more bolts, in the usual manner.

With the construction and arrangement of parts shown herein, I employ supporting arms, one of which is indicated at 5, each arm having its front or outer end provided with an eye 6 for the reception of a bolt 7, which bolt secures to the front end of such arm a clamp 8 applied to the rear member of the bumper, indicated generally at 9.

In order to accommodate the projection of the fender 3, the bumper supporting arm is bent inwardly at the rear of the front spring eye 10, as indicated at 5ª. The portion of the arm at the rear of the bend 5ª is secured to the adjacent side frame by means of a bolt 11 and a spacing sleeve 12. The rear or inner end of the arm 5, when the said arm is approximately horizontal, will extend beneath the bottom of the fender bracket 4. This end of the arm is provided with an upright arm or extension 13, riveted thereto, and the upper end of this extension will be secured to the side frame 2 by means of a bolt 14, which may be the original fender bracket bolt, or which may be used in place of such bolt if the original is too short, the bolt serving jointly to secure the said bracket and the rear or inner end of the arm 5 to the frame member 2.

The construction and arrangement of the parts described herein results in an arm which may be conveniently and quickly applied to the front ends of side members arranged as described herein and which will, when so applied, effectively support a bumper and transmit the impacts delivered to and by said bumper to the said side members in a manner to enable the shock-receiving portions to withstand the incidents of use.

Having thus described my invention, what I claim is:

1. The combination, with the side frame member and fender of an automobile, the said fender extending outwardly from the front of the side frame member, of a bumper supporting arm having its front or outer portion offset from its rear or inner portion, a bolt securing the front of the said arm to the rear portion of the side frame member, a spacer surrounding the bolt and interposed between the said arm and the frame member, and means projecting from the rear or inner end of the said arm and connected to the said frame member.

2. The combination, with the side frame member and fender of an automobile, the said fender extending outwardly from the front of the side frame member, of a bumper supporting arm having its front or outer portion offset from its rear or inner portion, means securing the rear portion of the said arm to the side frame member, and means projecting from the rear or inner end of the said arm and connected to the said frame member.

3. The combination, with the side frame member of an automobile, of a fender bracket, a bumper supporting arm secured intermediate of its ends to the said side frame member, a vertical projection carried by the rear or inner end of the said arm, and means connecting the said projection and the said bracket to the said side frame member.

4. The combination, with the side frame member of an automobile, of a fender bracket, a bumper supporting arm secured to the said side frame member intermediate of its ends, a projection carried by the rear or inner end of the said arm, and a bolt extending through the said projection, bracket and member and connecting the projection and bracket to said member.

5. The combination, with the side frame member of an automobile, of a fender projecting outwardly from the front end of said member, a fender bracket connected to the said fender at the rear of the front end of said side member, a bumper supporting arm having its front portion outwardly offset from its rear portion, a bolt connecting the front of the rear portion of said arm to the said side member, a vertical arm connected to the rear end of said bumper supporting arm, and a bolt connecting the last mentioned arm and the bracket to the side frame member.

In testimony whereof, I hereunto affix my signature.

WAYNE E. DUNSTON.